(12) United States Patent
Tallinger

(10) Patent No.: US 7,825,790 B2
(45) Date of Patent: Nov. 2, 2010

(54) EMERGENCY VEHICLE LIGHT BAR WITH MESSAGE DISPLAY

(75) Inventor: Gerald G. Tallinger, Austin, TX (US)

(73) Assignee: Lonestar Inventions, LP, Austin, TX (US)

( * ) Notice: Subject to any disclaimer, the term of this patent is extended or adjusted under 35 U.S.C. 154(b) by 268 days.

(21) Appl. No.: 12/102,978

(22) Filed: Apr. 15, 2008

(65) Prior Publication Data

US 2009/0256697 A1    Oct. 15, 2009

(51) Int. Cl.
*B60Q 1/52* (2006.01)

(52) U.S. Cl. .................. 340/472; 340/902; 340/825.36; 340/7.52

(58) Field of Classification Search ................. 340/472, 340/473, 487, 488, 901–902, 825.36, 825.49, 340/988, 468, 539.1, 989, 321, 426.18, 7.51, 340/7.52

See application file for complete search history.

(56) References Cited

U.S. PATENT DOCUMENTS

| | | | |
|---|---|---|---|
| 2,968,025 A | 1/1961 | Owns | |
| 3,107,856 A | 10/1963 | Hostetter | |
| 3,264,607 A | 8/1966 | Sherman | |
| 3,318,031 A | 5/1967 | Whaley | |
| 3,405,389 A | 10/1968 | Romain | |
| 3,761,890 A | 9/1973 | Fritts | |
| 4,081,788 A | 3/1978 | Gaspar | |
| 4,152,854 A | 5/1979 | Berry, Jr. | |
| 4,259,660 A * | 3/1981 | Oliver | 340/480 |
| 4,361,828 A | 11/1982 | Hose | |
| 4,431,984 A | 2/1984 | Bileck | |
| 4,631,516 A | 12/1986 | Clinker | |
| 4,662,095 A * | 5/1987 | Higgins | 40/592 |
| 4,868,542 A | 9/1989 | Thompson | |
| 4,928,084 A | 5/1990 | Reiser | |
| 5,010,319 A | 4/1991 | Killinger | |
| D349,517 S | 8/1994 | Neff | |
| 5,438,780 A | 8/1995 | Winner | |
| 5,558,424 A | 9/1996 | Zeligson | |
| 5,585,782 A * | 12/1996 | Yosko | 340/471 |

(Continued)

FOREIGN PATENT DOCUMENTS

DE    3533588    4/1987

(Continued)

*Primary Examiner*—Daniel Previl
(74) *Attorney, Agent, or Firm*—Law Offices of Mark L. Berrier

(57) ABSTRACT

A lighting subsystem and a light bar structure upon which the lighting subsystem is mounted. The lighting subsystem has a display that incorporates both warning signal lights and a programmable message display and is configured to enable the positioning of the lighting subsystem in multiple positions, including a low-profile position and a higher profile position. In one embodiment, the lighting subsystem utilizes an LED matrix display which includes interleaved message-display LEDs and warning-signal LEDs. The system may be positioned at an aerodynamic pursuit angle, and the LEDs may be oriented to maximize forward intensity of the emitted light in the pursuit position. In the low-profile position, the lighting subsystem may be retracted into a recessed compartment in the roof of an emergency vehicle. The message display may be configured to display preprogrammed messages or user-programmed messages, and may be operable by a user outside the vehicle using a remote control.

13 Claims, 8 Drawing Sheets

U.S. PATENT DOCUMENTS

| | | | |
|---|---|---|---|
| 5,652,565 A | 7/1997 | Salcedas | |
| 5,660,457 A | 8/1997 | Lyons | |
| 5,825,281 A * | 10/1998 | McCreary | 340/425.5 |
| 5,884,997 A | 3/1999 | Stanuch | |
| 5,998,839 A | 12/1999 | Cho | |
| 6,461,008 B1 | 10/2002 | Pederson | |
| 6,511,216 B2 | 1/2003 | Strickland | |
| 7,262,707 B2 | 8/2007 | Kaoh | |
| 2003/0021121 A1 | 1/2003 | Pederson | |
| 2003/0142044 A1* | 7/2003 | Berry | 345/55 |
| 2007/0195939 A1 | 8/2007 | Sink | |

FOREIGN PATENT DOCUMENTS

| | | |
|---|---|---|
| DE | 3807684 | 11/1989 |
| DE | 4001302 | 8/1991 |
| DE | 4206959 | 9/1993 |
| DE | 20310472 | 11/2004 |
| GB | 2347004 A | 8/2000 |
| GB | 2386463 A | 9/2003 |
| JP | S60-50049 | 3/1985 |

* cited by examiner

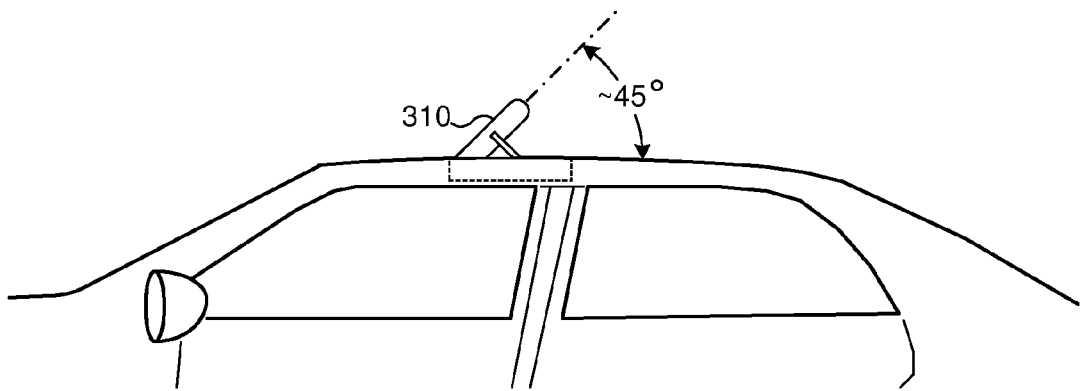
Fig. 8
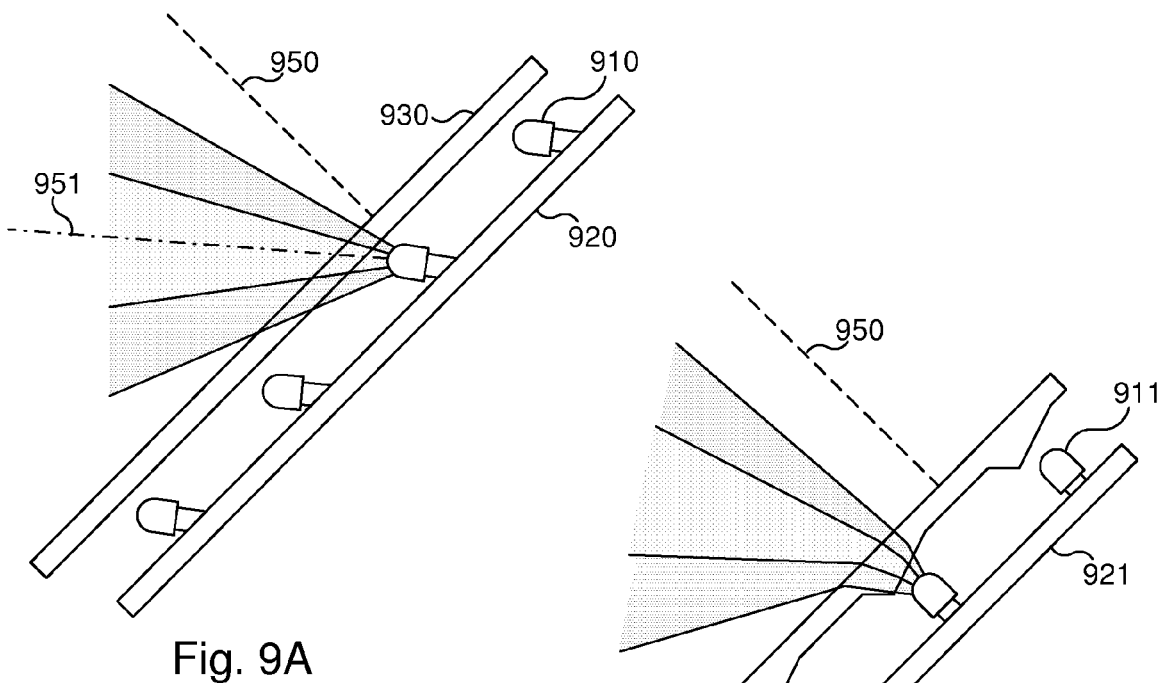
Fig. 9A
Fig. 9B

EMERGENCY VEHICLE LIGHT BAR WITH MESSAGE DISPLAY

BACKGROUND

1. Field of the Invention

The invention relates generally to emergency vehicle lighting and more particularly to systems for providing both emergency signal lighting and visual messaging capabilities to emergency vehicles.

2. Related Art

Emergency vehicles such as police cars and fire trucks often have emergency signaling systems mounted on them. Typically, these systems include emergency signaling lights that may flash in various colors and patterns, as well as sirens or public address loudspeakers. These devices enable emergency services personnel such as police officers or firefighters to warn people in the vicinity of the emergency vehicles that the vehicles are approaching or that there is a dangerous situation which is being handled by the emergency services personnel.

Many different types of emergency signaling systems exist. Typically, these systems are mounted on a bar or similar structure on the roof of the emergency vehicle. Consequently, these systems are often referred to as "light bars." Many different types and configurations of emergency signaling lights, sirens and loudspeakers have been developed. These systems can facilitate such activities as stopping violators, establishing a "right of way", or warning vehicles of road hazards. The traditional lights when activated can be viewed from the front, rear or sides and mostly are the same, front and rear, with the exception of light colors. Sirens and loudspeakers are typically mounted in or behind the front grill of the vehicle.

Although emergency vehicles such as police cars carry light bars to make them more visible in an emergency situation, there are times when it is desirable for these vehicles to be less noticeable. Traditional light bars on emergency vehicles are typically mounted across the entire top of the vehicle, which makes them more visible and results in an easily recognizable profile. This can provide an unwanted identification of the vehicle as a law enforcement vehicle when it approaches other vehicles. For instance, if a police officer wishes to approach a speeding car to confirm that it is exceeding the posted speed limit, it may be desirable for the police vehicle to be less easily identifiable until the police officer decides to pull over the speeding car. Then, it would be beneficial for the police vehicle to be more visible and identifiable so that the speeding car would be aware of the police vehicle and the need to pull over.

More advanced light bar systems contain banks of LEDs (light emitting diodes) which may be positioned two or more rows high and may therefore be used to design a low-profile light bar. These low-profile light bars may be mounted on the top of an emergency vehicle, on the front of the vehicle above or near the top of the windshield, or inside the vehicle near the top of the windshield. The profiles of these light bars are lower than traditional light bars but, if mounted outside the vehicle, are still recognizable as described above. Light bars mounted either near the top of the windshield or inside the windshield suffer from the undesired effect of blocking part of the occupants' view through windshield. This may make it difficult to see traffic lights and other signs from inside the vehicle. Similarly, light bars mounted on the inside of the rear window of an emergency vehicle can block the view through the window and may therefore hinder safe operation of the vehicle.

Another method which is currently used to make emergency vehicles more stealthy is to replace existing headlights and directional lights with colored warning lights and/or to mount warning lights in the grill area on the front of the vehicle and on the rear of the vehicle. However, these warning lights are generally less visible and therefore less effective than lights which are mounted on the roof of the vehicle. These warning lights are also typically expensive to install and expensive to replace when the vehicle is put out of service. Further, when the warning lights are installed in place of the headlamps or directional signal lights, they negate the function of those lights.

Conventional emergency vehicle light bars also typically provide no means for the emergency vehicles to communicate the specific nature of a traffic warning or road hazard, but can only slow down traffic by flashing the emergency lights. This may cause problems, as some drivers may panic and brake too quickly or pay more attention to the lights and/or road hazard than to other vehicles. This may cause result in accidents or additional traffic congestion. While stand-alone message signs for traffic control and/or hazard warning are available, these signs are either stationary or movable only by towing them into position. This takes time, so the signs are not usually in place until long after the emergency vehicle arrives at the scene of the accident or hazard. In most cases, these signs are not used at all because of their inconvenience.

Smaller message display units may be positioned in the interior of an emergency vehicle in the rear window. These small displays are mainly used in private vehicles to display courtesy messages and are designed to be viewed from a short distance behind the vehicles. These message units are not suitable for use in an emergency situation to warn drivers of road hazards and other warning messages because they are not visible from a long distance and therefore do not allow drivers of other vehicles to take action as directed by the message on the display. Also, they typically block a substantial portion of the view through the vehicle's rear window and may therefore hinder the safe operation of the vehicle.

There is also a class of vehicle displays which are oriented toward advertising. These displays are designed to be viewable to pedestrians and other vehicles primarily from the sides of the vehicle carrying the display. Also, since these displays are intended to be highly visible, they are not designed to have a low profile or to be stealthy or hidden when not in use. Further, these advertising-oriented displays are typically designed to display a single predetermined message or a series of rotating messages which may not be programmed from within the vehicle.

There are many examples of the systems that are available in the prior art. For example, U.S. Pat. No. 6,461,008 to Pederson illustrates a light bar having a typical roof-mounted configuration, but this system does not have a message display and is not movable. German Patent Applications 3,807,684 and 4,001,302 provide examples of roof-mounted light bars that incorporate message displays, but these systems are not movable. U.S. Pat. Nos. 4,928,084 and 5,825,281 illustrate window-mounted displays, but these displays do not incorporate emergency signal lights and are not movable. German Patent Applications 3,533,588 and 3,631,578 and Japanese Patent Application 60050049 show signs that can be folded down, but these signs do not incorporate emergency signal lights and are not programmable with different messages. German Patent Application 20310472U illustrates a light bar that has a message display, but only the message display folds down, and the message display is not programmable. U.S. Pat. No. 7,262,707 shows a light bar with a message display that incorporates flashing lights, but the light bar is not movable. Finally, U.S. Pat. Nos. 3,761,890 and 4,081,788 are examples of emergency lights and message displays that are movable, but neither of these systems has programmable displays and neither can be aerodynamically positioned.

As explained above, existing light bars and vehicle displays do not allow emergency vehicles to have the combined capabilities of selective stealth, aerodynamic and high visibility positions, as well as combined emergency signal lights and programmable message or graphics displays. It would therefore be desirable to provide emergency signaling/messaging systems that provide these capabilities and other capabilities as described below.

SUMMARY OF THE INVENTION

This disclosure is directed to an emergency vehicle light bar with a message display that solves one or more of the problems discussed above. In one particular embodiment, the system includes a lighting subsystem and a light bar structure upon which the lighting subsystem is mounted. The lighting subsystem has a display that incorporates both warning signal lights and a programmable message display. The light bar structure is configured to enable the positioning of the lighting subsystem in multiple positions, including a low-profile position and a higher profile position. In one embodiment, the lighting subsystem utilizes an LED matrix display. The LEDs of the display include interleaved message-display LEDs and warning-signal LEDs. The system may be positioned at an aerodynamic pursuit angle, and the LEDs may be oriented to maximize the forward intensity of the emitted light in the pursuit position. In the low-profile position, the lighting subsystem may be retracted into a recessed compartment in the roof of an emergency vehicle. The message display may be configured to display preprogrammed messages or user-programmed messages, and may be operable by a user outside the vehicle using a remote control.

One embodiment of the present invention is an emergency vehicle light bar which folds down into an enclosure in the vehicle's roof so that it is hidden when not in use and folds up either partially or perpendicular to the roof when in use. In the folded down position, the system provides a stealth or unmarked appearance. In the upright position, the system presents a vehicle emergency light bar and a warning message display. The emergency lights and message display can be used for situations such as traffic control for accidents or road hazards, lane closures, Amber alerts, construction alerts, road closures, evacuation route, road closure identification, and other road warnings or instructions when the fast setup of a road warning sign is desirable.

The combination retractable light bar and emergency message bar overcomes problems associated with previous low profile or stealth light bar designs, while adding the capability to quickly set up a message display to warn drivers of road hazards such as lane closures or accidents ahead, or community service messages such as amber alerts.

The light bar/message display device can be folded down into the roof of the vehicle or placed horizontally in a trough on top of the vehicle and can be raised by motors, hydraulics, pneumatic, or manual means when activated, thus retaining a stealth or unmarked appearance when not in use.

The light bar is visible from the front, rear and sides of the vehicle when used as a light bar with flashers, and is visible from the front and rear when used as a message bar. A different message or flasher pattern can be displayed on the front and rear of the light bar/message display, and letters can be reversed as to be readable from a rear view mirror on either side.

The light/message bar may use high brightness light emitting diodes (LEDs) as the light source in the preferred embodiment, or may alternatively use a matrix of small, conventional lamps, bright liquid crystal displays (LCDs), plasma displays or other similar technology. It should be noted that although the embodiments described below primarily use LEDs, references to LEDs should be construed to include these other light sources as well. In some technologies, it is possible to display pictures or icons for warnings or messages. An optional video camera option may be added into the front or rear display to capture a record of police actions, worker actions, or a record of travel or other video logs.

The core of the light/message bar is comprised of a rigid frame which acts to support the mounted printed circuit boards containing the light sources and control circuitry and provides a means of getting rid of heat buildup from the light sources. The core may also be connected to or have integrated into it a support for the covers or lenses for the display and the end caps with flasher displays to seal the end of the assembly. The lens covers may be flat and clear or be tinted with the desired colors in specific locations and have molded in patterns to diffuse and/or focus the light as desired.

The case assembly can be attached to the vehicle either by embedding it into a hole in the roof for the full stealth embodiment, adhering or screwing it to the top of the roof for one low profile embodiment, or attaching it to side rails for another low profile embodiment. A power cable can be dropped through the roof, routed through the door opening or around the interior of the vehicle, hidden in the frame/upholstery, or fastened to the inside passenger compartment. The power source may be connected to the fuse box or other power lines, or may be plugged into a power outlet such as a cigarette lighter outlet.

The message and lights may be controlled through a dedicated control box or through a laptop located in the vehicle. The signal from the control box or laptop may be transmitted via a cable or short range wireless signal such as zigbee. From a pop-up program on the laptop or within the control box, the operator may choose from a list of standard flasher patterns and/or messages, or may type in custom messages to be displayed in the front and/or rear of the display. The message may be displayed as normal text or in reverse such that it can be seen correctly in a rearview mirror of another vehicle.

The emergency light bar/message bar may be mounted on a free standing holder and be used remotely in the case of emergency situations such as road or lane closures, road work, accidents, amber alerts, and other similar situations where a temporary flasher warning/message is required. The emergency light bar/message bar can be pre-programmed with a list of standard flasher patterns and standard messages and be able to be wired via a removable connector or via wireless methods to a remote computer or control box to program custom messages.

The light bar/message bar could be made to different heights and widths to fit the desired need of the application, thus it may be as small as practical or may be made intentionally larger for viewing farther away. Furthermore, the light bar/message bar may be made as to rotate to the left or right on top of the vehicle to make the message bar more visible in the flasher or message configuration.

Numerous alternative embodiments are also possible.

BRIEF DESCRIPTION OF THE DRAWINGS

Other objects and advantages of the invention may become apparent upon reading the following detailed description and upon reference to the accompanying drawings.

FIG. 8 is a diagram illustrating the positioning of the lighting subsystem at an aerodynamic pursuit angle in accordance with one embodiment.

FIGS. 9A and 9B are diagrams illustrating exemplary configurations of the display LEDs so that the light from the LEDs is emitted primarily in a forward direction when the display is in a pursuit position.

Figure 1:
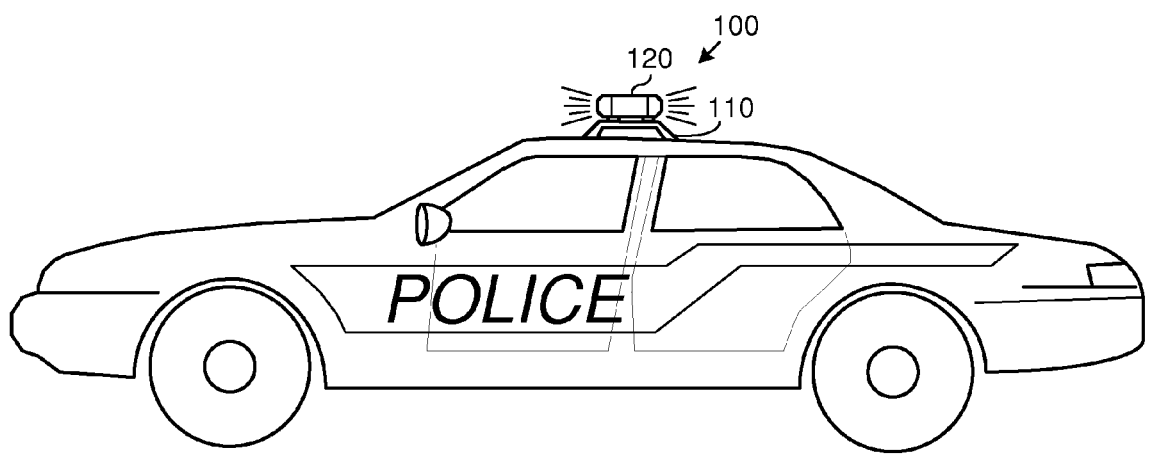
FIG. 1 is a diagram illustrating the position and profile of a traditional light bar on a police vehicle.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for emergency vehicle signal and messaging systems. More particularly, the present systems include emergency signal lights and a programmable message display, wherein at least the programmable message display is configured to be alternately positioned in at least a first, lower-profile position and a second, higher-profile position.

One embodiment utilizes an LED matrix display that includes a first set of LEDs which are used to display messages and a second set of LEDs which are used for emergency signaling (e.g., flashing.) The LEDs of the first and second sets are distributed throughout the display field, so that the viewable area of the display may alternately be used to display messages or flashing signals. ("Emergency signaling" is used herein to refer to the use of flashing or otherwise changing patterns of lights to attract attention to the emergency vehicle.)

This LED matrix is mounted to the roof of an emergency vehicle such as a police car. The mountain display is movable between several different positions. In one position (a stealth position) the display is retracted and positioned horizontally within a recess in the roof so that it cannot be seen from the front, rear or sides of the vehicle. In another position, the display is raised so that it is vertical and is visible, particularly from the front and rear of the vehicle. The display may also include lights that are visible from the side of the vehicle.

In this embodiment, the display may also be placed in another position in which the display is raised so that it is visible, but is not vertical. Instead, the display is positioned at an angle (e.g., 45°) with respect to the roof of the vehicle so that it is more aerodynamic. As a result, in this position, the display does not hinder the performance of the vehicle when it is in pursuit of another vehicle.

This embodiment also includes a control system that can receive signals from a wireless remote control. The wireless remote is removably mounted in the vehicle. The wireless remote may, for example, be placed in a cradle that recharges the remote control. The wireless remote is configured to enable a user to enter text messages that will be displayed, to select pre-programmed messages for the display, and to select signaling modes (e.g., the patterns for the flashing emergency signal lights.) When the user leaves the vehicle, the wireless remote can be removed from the recharging cradle so that the displayed messages or signaling modes can be changed by the user without having to return to the vehicle.

Referring to FIG. 1, a diagram illustrating the position and profile of a traditional light bar on a police vehicle is shown. In this figure, light bar 100 has a support structure 110 which is attached to the roof of the police vehicle and which supports the functional portion 120 of the light bar. Functional portion 120 typically includes a set of emergency signal lights and speakers for a siren and a public address system (e.g., a loudspeaker.) Light bar 100 has a fixed position on the roof of the vehicle and is raised above the roof so that the lights will be clearly visible to those around the vehicle.

Figure 2:
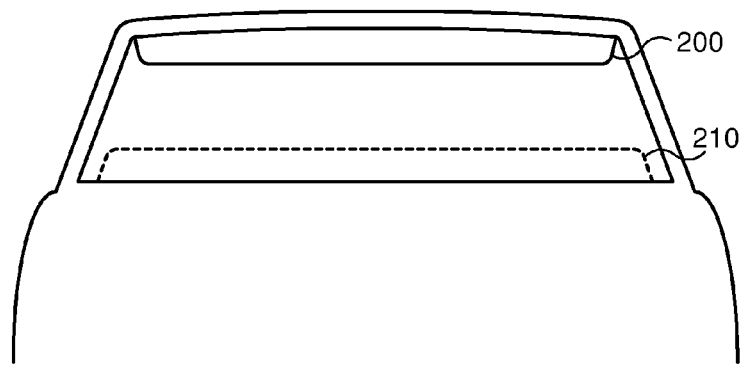
FIG. 2 is a diagram illustrating a rear view of a police vehicle using an emergency signal light system that is mounted inside the passenger compartment of the vehicle.

Referring to FIG. 2, a diagram illustrating a rear view of a police vehicle using an emergency signal light system that is mounted inside the passenger compartment of the vehicle is shown. In this example, a light system 200 is mounted to the underside of the vehicle's roof near the rear window of the vehicle. These lights are visible to persons and vehicles which are positioned behind the police vehicle. A similar set of lights may additionally (or alternatively) be mounted to the underside of the roof near the windshield so that they are visible to persons and vehicles in front of the police vehicle. The lights may alternatively be mounted near the bottom of the rear window and/or windshield as shown by outline 210. As explained above, these systems are more stealthy and aerodynamic than the traditional light bar of FIG. 1, but they are also less visible when in use, and they partially block the view of persons inside the police vehicle.

Figure 3:
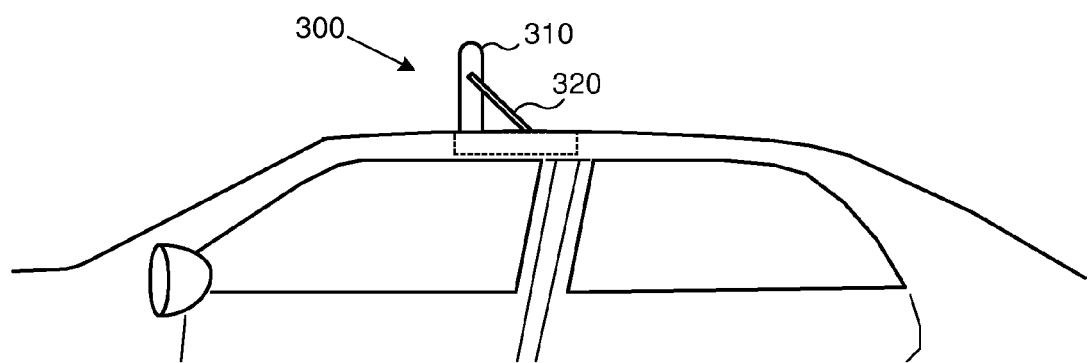
FIG. 3 is a diagram illustrating an exemplary embodiment of the present invention.

Referring to FIG. 3, a diagram illustrating an exemplary embodiment of the present invention is shown. This figure illustrates the positioning of an emergency signaling system 300 on the roof of an emergency vehicle such as a police vehicle. System 300 includes a lighting subsystem 310 and a variable-position support structure 320. As will be described in more detail below, lighting subsystem 310 includes an integrated message display and emergency signal lights. Variable-position support structure 320 allows lighting subsystem 310 to be moved into different positions on the roof of the vehicle. FIG. 3 shows system 300 with lighting subsystem 310 in a vertical position that provides maximum visibility of the emergency signal lights and message display.

Figure 4A:
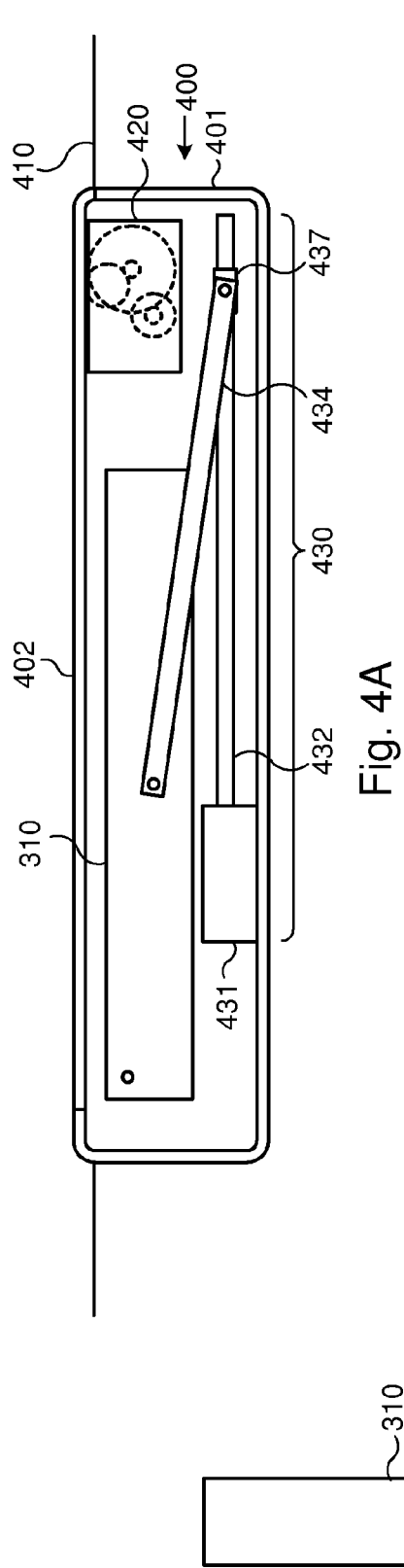
FIGS. 4A and 4B are a pair of diagrams illustrating the exemplary embodiment of FIG. 3 in more detail.
Figure 4B:
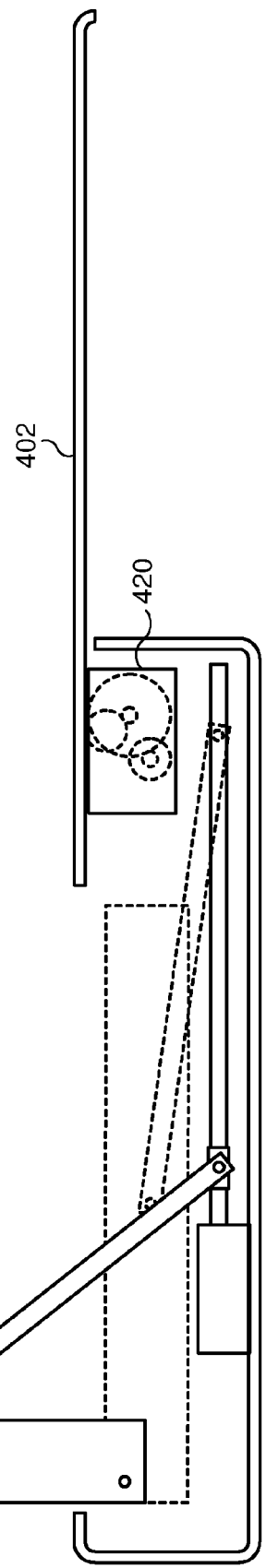

Referring to FIGS. 4A and 4B, a pair of diagrams illustrating the exemplary embodiment of FIG. 3 in more detail are shown. FIG. 4A is a side view of the system in a first position in which the message display and emergency signal lights are retracted into a substantially horizontal position in a recess in the roof of the vehicle so that they are not visible. FIG. 4B is a side view of the system in the second, vertical position in which the message display and emergency signal lights are raised above the roof of the vehicle so that they are visible.

Referring to FIG. 4A, the system is shown in a retracted position. The system is contained within an enclosure 400 that is mounted in the roof of the vehicle. The upper surface 410 of the roof is shown in the figure for reference. Enclosure 400 includes a base portion 401 and a lid 402. Lid 402 is slidably mounted so that it can be moved horizontally to open the enclosure. A motor and gear system 420 is coupled to lid 402 to move the lid and thereby open or close the enclosure. In the retracted position, lighting subsystem 310 is positioned horizontally within enclosure 400. A display positioning mechanism 430 is coupled to lighting subsystem 310 to hold the lighting subsystem in place and to move the lighting subsystem when necessary. Positioning mechanism 430 may, for example, include a motor 431 coupled to a threaded shaft 432. An internally threaded sleeve 433 is positioned on threaded shaft 432 and is pivotally coupled to support arm 434. When threaded shaft 432 is rotated, threaded sleeve 433 moves horizontally on the threaded shaft, causing support arm 434 to raise or lower display system 310.

The embodiment of FIG. 4 is intended to fit within essentially the same space that would be occupied by a sunroof in a passenger vehicle. The lighting subsystem is relatively thin, so it does not require a great deal of space and does not substantially reduce the headroom within the vehicle. More importantly, because the system is situated in the center of the roof, it does not impair the view of people in the vehicle, as is the case with lighting systems that are mounted inside the passenger compartment near the windshield or rear window.

It should be noted that the enclosure for the system of figure is not necessary in all embodiments. The system may be mounted within a recess that does not have a lid which forms an enclosure, or it may even be mounted on top of the roof of the vehicle (i.e., not within a recess in the roof.) The further, the specific mechanism disclosed in connection with FIG. 4 for raising or lowering the display may be replaced by other mechanisms in other embodiments. Such variations are considered to be within the scope of the present disclosure.

Referring to FIG. 4B, the system is shown in a vertical position. In this position, lighting subsystem 310 extends upward above the roof of the vehicle so that it is visible to persons around the vehicle. It can be seen in this figure that lid 402 has been opened by sliding it horizontally to the right in the figure. This is accomplished by motor and gears 420. With open, display positioning mechanism 430 can raise lighting subsystem 310 through the opening in the enclosure. As noted above this is accomplished by rotating threaded shaft 432, which causes sleeve 433 to move to the left in the figure, which in turn causes support arm 434 to pivot lighting subsystem 310 upward.

Figure 5:
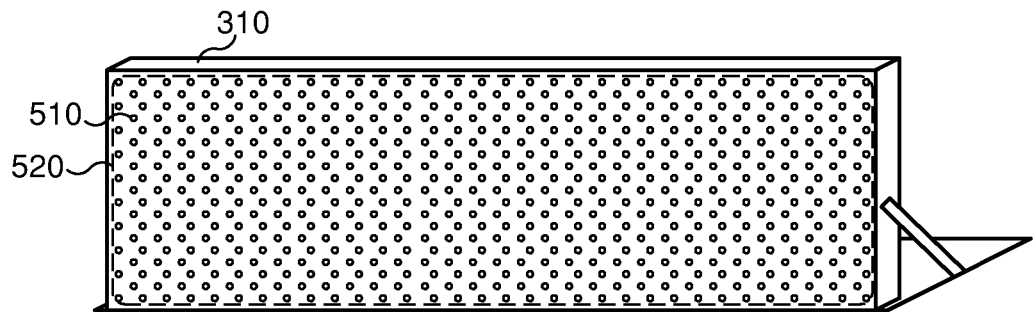
FIG. 5 is a perspective view of the system is shown with the lighting subsystem in a raised position in accordance with one embodiment.

Referring to FIG. 5, a perspective view of the system is shown with the lighting subsystem in a raised position. It can be seen in this figure that lighting subsystem 310 includes an array or matrix of LEDs (e.g., 510.) The term "matrix" is used hereto referred to the arrangement of the LEDs in rows and columns within a display field 520. In this embodiment, the matrix is formed by two different sets of LEDs. A first set of the LEDs is used to form a textual display for communicating messages to persons around the vehicle. The "textual" display may display not only alphanumeric characters but also non-alphanumeric characters (e.g., "-", "/", etc.) and graphics (e.g., arrows or other symbols.) A second set of the LEDs is used in place of traditional warning signal lights ("flashers") and may be used to display flashing red and blue patterns or other patterns that may be appropriate for particular emergency situations. The intensities of the LEDs of the different sets may be different and, in one embodiment, the LEDs of the second set (the signal lights) are higher-intensity LEDs than the LEDs of the first set (the message display).

Figure 6:
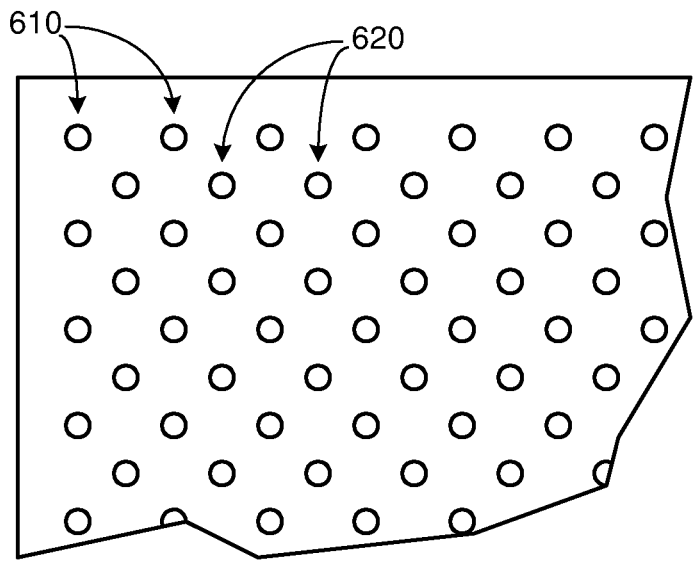
FIG. 6 is a diagram illustrating an exemplary arrangement of message display and warning signal LEDs in accordance with one embodiment.

In this embodiment, the LEDs of the two different sets are alternated across display field 520 so that each set takes up most of the display field. An exemplary arrangement of LEDs from each set is shown in FIG. 6, where LEDs of the first set are indicated by 610 and LEDs of the second set are indicated by 620. The rows of each set may be considered to be "interlaced" with the rows of the other set. As a result of this arrangement, text messages can be displayed across essentially the entire display field, and signal light patterns can also be presented across almost all of the display field.

The number of rows and number of columns of the LEDs in the display may vary from one embodiment to another. Greater numbers of rows and/or columns enable more detailed messages or graphics to be displayed. Greater numbers of LEDs can also increase the visibility of the display. LEDs of the message display, as well as warning signal LEDs, may be of one or more colors. The various LEDs may also have different intensities.

While display field 520 is shown as extending across the front of lighting subsystem 310, it should be noted that this embodiment includes a similar display field on the opposite side of the lighting subsystem. The display field on the back of the lighting subsystem would also include two sets of LEDs, one of which is configured to display textual messages and the other of which is configured to display emergency signal patterns.

Figure 7:
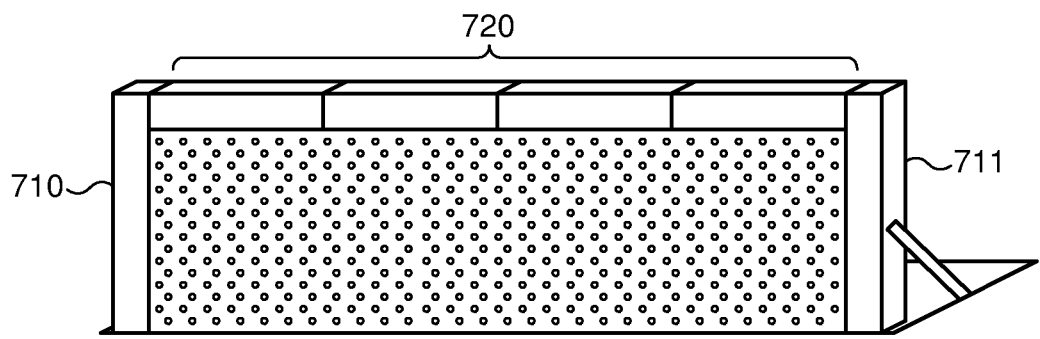
FIG. 7 is a perspective view of the lighting subsystem in accordance with an alternative embodiment.

Referring to FIG. 7, a perspective view of an alternative embodiment of the lighting subsystem is shown. In this embodiment, an LED matrix is provided on both the front and back of the lighting subsystem, but additional signal lights are also provided. In this embodiment, traditional flashing signal lights 710 and 711 are provided on the side of the lighting subsystem. These lights may provide improved visibility of the emergency signals from the sides of the vehicle. Additional traditional-style flashing signal lights 720 may be positioned on the top of the lighting subsystem (i.e., the uppermost part of the lighting subsystem when it is in a raised position.)

Another feature of the present system is the ability to position the lighting subsystem at an angle with respect to the roof of the emergency vehicles so that the textual message display and the warning signal lights are visible above the roof, but the lighting subsystem is more aerodynamic and does not hinder performance of the vehicle (for example, in a pursuit situation.) This is illustrated in FIG. 8. As shown in this figure, lighting subsystem 310 is positioned at an angle of approximately 45° with respect to the roof of the emergency vehicle in which it is installed. It should be noted that this angle may be different in other embodiments and will typically be between 30° and 60°. The angle between the lighting subsystem and the roof may be predetermined, or the system may be configured so that the angle is continuously variable. The system may be configured to place the lighting subsystem in this pursuit angle in response to a manual input by a user, or it may be configured to automatically adjust the position of the lighting subsystem based upon the detected speed of the vehicle.

Because the lighting subsystem may be positioned at an angle with respect to the roof of the emergency vehicle when the vehicle is in pursuit of another vehicle, it is important that the lighting subsystem is visible, particularly to the vehicle which is being pursued. Therefore, in one embodiment of the present system, the LEDs of the display are angled so that the light emitted by the LEDs is directed primarily forward with respect to the vehicle. This is illustrated in FIGS. 9A and 9B. FIGS. 9A and 9B are diagrams illustrating configurations of the display LEDs so that the light from the LEDs is emitted primarily in a forward direction when the display is in a pursuit position. FIG. 9A is a diagram showing a configuration in which the LEDs of the display are positioned at an angle with respect to the face of the display. FIG. 9B is a diagram showing a configuration in which a cover placed over the LEDs serves to redirect the light of the LEDs.

Referring to FIG. 9A, a partial cross-section of the lighting subsystem is shown. It can be seen from the figure that the LEDs (e.g., 910) are mounted to a circuit board or other substrate 920 eight flat, transparent cover 930 is placed over the LEDs to protect them. It can be seen that each of the LEDs is positioned so that, rather than facing directly away from circuit board 920, they face somewhat downward. In this embodiment, it is assumed that the pursuit position of the lighting subsystem will be 45° from vertical, so the LEDs are angled approximately 45° from a direction which is perpendicular to the circuit board. This perpendicular direction is indicated by reference number 950, and the LEDs are aligned with the direction of reference line 951. It should be noted that the LEDs need not be placed at the same angle as the forms between the lighting subsystem and vertical, but may instead have a smaller angle, so that direction in which the LEDs primarily emit light lies between directions 950 and 951. The angle of the LEDs may be chosen to balance the need for light intensity in the the vertical and pursuit positions.

Referring to FIG. 9B, a partial cross-section of the lighting subsystem in an alternative embodiment is shown. In this embodiment, the LEDs (e.g., 911) are positioned so that they face directly away from circuit board 921 (i.e., in direction 950.) Cover 931, however, is not simply a flat, optically neutral component. Instead, one side of the cover is shaped to bend the rays emitted by the LEDs downward, away from direction 950, thereby achieving essentially the same effect as if the LEDs had been positioned at an angle with respect to circuit board 921. This light-bending function may also be provided by a component which is separate from and is positioned behind the cover of the lighting subsystem. This component may be movable (e.g., perpendicular to direction 950) so that the light-bending portions of the component can be shifted in front of the LEDs. In this manner, the direction of the highest intensity light from the LEDs could be shifted closer to, or farther away from direction 950.

Figure 10:
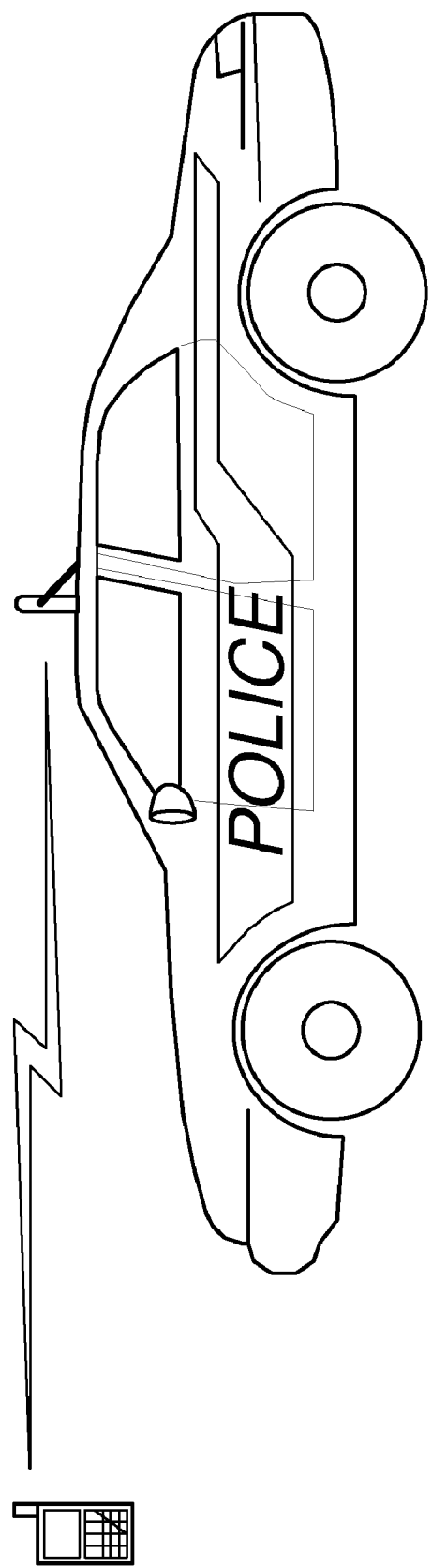
FIG. 10 is a diagram illustrating the capability of controlling the system remotely in accordance with one embodiment.

Another feature that may be incorporated into the present system is the capability of controlling the system remotely. This is illustrated in FIG. 10. As noted above, the display of the present system may be used not only to display flashing emergency signals, but also to display textual or graphical messages. This may be particularly important in situations where the display is used for traffic control. For instance, when a police vehicle arrives at the scene of a traffic accident, it will typically have its emergency signal lights flashing, and these lights will remain flashing while the police officer exits the vehicle and investigates the accident or assists with the accident or traffic control. It may later be desirable to discontinue the use of the flashing signal lights and instead display a textual or graphical message to direct traffic around the accident. Since the officer can control the display using a remote control, this can be accomplished without having to return to the vehicle. This same remote control can also be used to control the display and/or emergency signal lights when the officer is in the vehicle. When the remote control is in the vehicle, it can be mounted in a recharging cradle so that it will be continuously charged and ready for use outside the vehicle.

Figure 11:
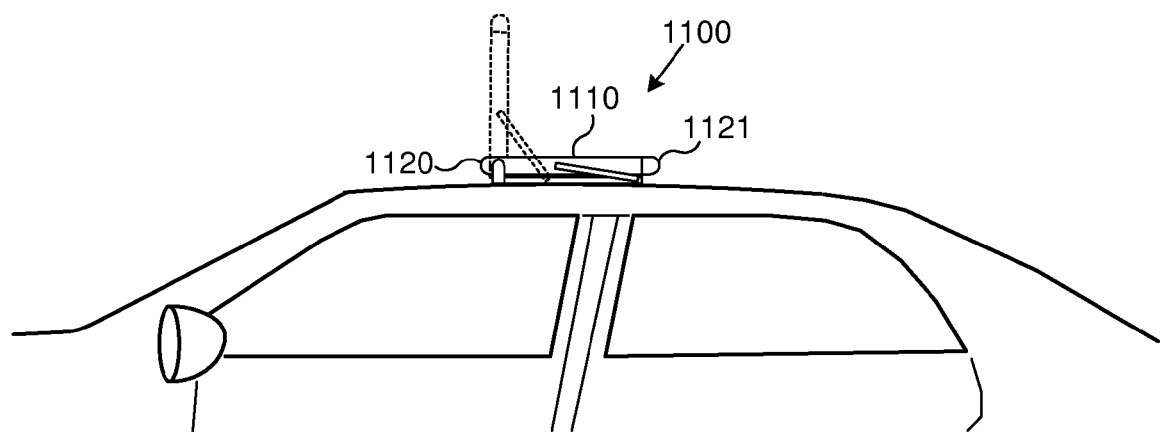
FIG. 11 is a diagram illustrating an embodiment in which the lighting subsystem is not recessed into a compartment within the roof of the emergency vehicle.

There may be alternative embodiments of the present invention. For example, in one embodiment, the lighting subsystem is not recessed into a compartment within the roof of the emergency vehicle. Instead, the lighting subsystem is mounted on top of the roof. This is illustrated in FIG. 11. In this embodiment, the lighting subsystem may be placed in a first, generally horizontal position in which the textual display is facing upward, or it may be placed in a second, generally vertical position in which the textual display is facing forward (and a second textual display on the other side of the subsystem faces backward.) In the first position, the system has a low profile and is relatively stealthy. In the second position, the textual display is visible to the front and rear of the vehicle. The embodiment of FIG. 11 also has warning signal lights on the edges of the textual display, so that these lights face the front and rear of the vehicle when the lighting subsystem is in the first, horizontal position. The lights are on the top and bottom of the display when the lighting subsystem is in the second, vertical position.

Figure 12:
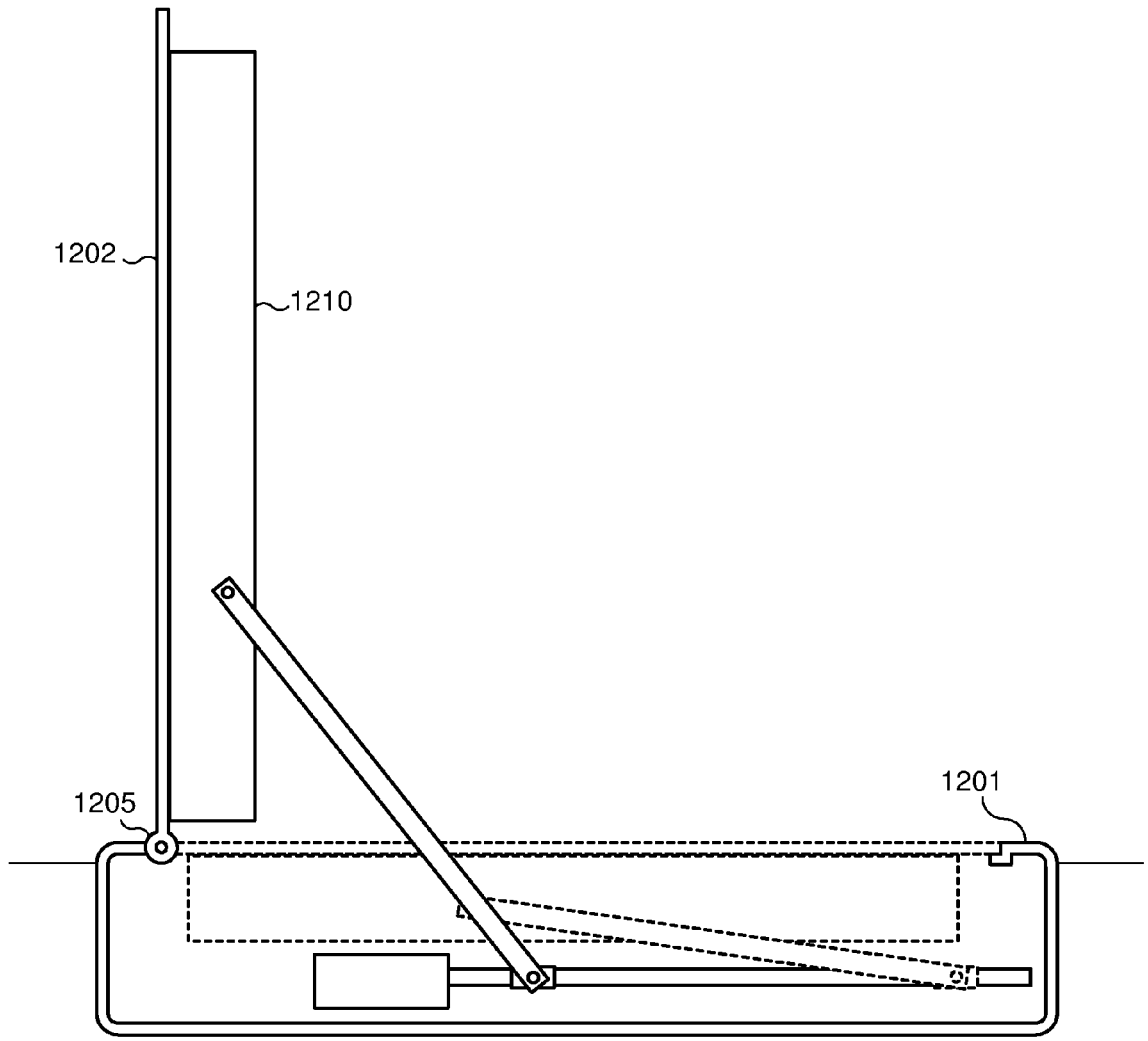

Another alternative embodiment is shown in FIG. 12. This embodiment is very similar to the embodiment of FIGS. 4A and 4B, but instead of having a lid (402) that slides back from the enclosure (401) into which the lighting subsystem (310) is recessed, the lid (1202) in this embodiment is hinged (1205) so that it pivots upward when the lighting subsystem (1210) is raised. Lid 1202 is transparent so that lighting subsystem 1210 is visible through it. When lighting subsystem 1210 is in the lowered position (shown by the dotted lines) lid 1202 seals the enclosure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A light bar and display system for an emergency vehicle comprising:
    a lighting subsystem which integrates into a single display field one or more warning signal lights and a message display configured to display a programmable text message, wherein the lighting subsystem includes a first set of LEDs configured to function as the warning signal lights and a second set of LEDs configured to function as the message display, wherein the first set of LEDs and the second set of LEDs are interleaved in a single matrix of LEDs; and
    a light bar structure upon which the lighting subsystem is mounted;
    wherein the lighting subsystem is movable between a first position in which the lighting subsystem has a first visual profile and a second position in which the lighting subsystem has a second visual profile which is greater than the first visual profile.

2. The light bar and display system of claim 1, wherein the first set of LEDs comprises high intensity LEDs and the second set of LEDs comprises low intensity LEDs.

3. The light bar and display system of claim 1, wherein the system is mounted on a roof of an emergency vehicle and wherein in the first position the lighting subsystem is substantially horizontal.

4. The light bar and display system of claim 3, wherein in the first position, the lighting subsystem is within a recess in the roof.

5. The light bar and display system of claim 1, further comprising a control subsystem coupled to the lighting subsystem and configured to enable a user to enter a text message for the message display.

6. The light bar and display system of claim 5, wherein the control subsystem is further configured to enable a user to select one of a group of preprogrammed messages for the message display.

7. The light bar and display system of claim 5, wherein the control subsystem is coupled to the lighting subsystem via a wireless communication channel.

8. The light bar and display system of claim 7, wherein the control subsystem is configured to be removable from the emergency vehicle and to enable a user to control the lighting subsystem from a location external to the emergency vehicle.

9. A light bar and display system for an emergency vehicle comprising:
    a lighting subsystem which integrates into a single display field one or more warning signal lights and a message display configured to display a programmable text message; and
    a light bar structure upon which the lighting subsystem is mounted;
    wherein the lighting subsystem is movable between a first position in which the lighting subsystem has a first visual profile and a second position in which the lighting subsystem has a second visual profile which is greater than the first visual profile, wherein the system is mounted on a roof of an emergency vehicle and wherein in the first position the lighting subsystem is substantially horizontal, and wherein in the first position, the warning signal lights are visible.

10. The light bar and display system of claim 1, wherein the light bar structure is movable to an intermediate position between the first position and the second position, wherein in the intermediate position, the aerodynamic drag of the system is less than the aerodynamic drag of the system in the second position.

11. The light bar and display system of claim 10, wherein in the intermediate position the lighting subsystem forms an angle of between 30° and 60° with the roof of the emergency vehicle.

12. A light bar and display system for an emergency vehicle comprising:
    a lighting subsystem which integrates into a single display field one or more warning signal lights and a message display configured to display a programmable text message; and
    a light bar structure upon which the lighting subsystem is mounted;
    wherein the lighting subsystem is movable between a first position in which the lighting subsystem has a first visual profile and a second position in which the lighting subsystem has a second visual profile which is greater than the first visual profile, wherein the light bar structure is movable to an intermediate position between the first position and the second position, wherein in the intermediate position, the aerodynamic drag of the system is less than the aerodynamic drag of the system in the second position, wherein the message display comprises a matrix of LEDs and wherein a first direction in which a highest intensity of light is emitted from the LEDs is angled away from a second direction which is perpendicular to a face of the lighting subsystem.

13. The light bar and display system of claim 12, wherein the lighting subsystem is configured to enable the first direction to be changed.

* * * * *